United States Patent
Vanier et al.

(10) Patent No.: US 9,720,135 B2
(45) Date of Patent: Aug. 1, 2017

(54) RETROREFLECTIVE COLORANTS

(71) Applicant: PPG Industries Ohio, Inc., Cleveland, OH (US)

(72) Inventors: Noel R. Vanier, Wexford, PA (US);
Xiangling Xu, Pittsburg, PA (US);
Eldon L. Decker, Gibsonia, PA (US);
Justin Bohn, Allison Park, PA (US);
John Donnelly, Monroeville, PA (US);
Beverly Bendiksen, Coraopolis, PA (US); Adam Choros, Delmont, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 379 days.

(21) Appl. No.: 14/266,949

(22) Filed: May 1, 2014

(65) Prior Publication Data

US 2015/0316686 A1 Nov. 5, 2015

(51) Int. Cl.
*G02B 1/04* (2006.01)
*C09C 1/00* (2006.01)
(Continued)

(52) U.S. Cl.
CPC ............... *G02B 1/04* (2013.01); *B01J 13/02* (2013.01); *B01J 13/14* (2013.01); *B01J 13/18* (2013.01); *B01J 13/22* (2013.01); *C09C 1/0015* (2013.01); *C09C 1/0021* (2013.01); *G02B 5/0252* (2013.01); *G02B 5/128* (2013.01); *C01P 2004/34* (2013.01); *C01P 2004/62* (2013.01);
(Continued)

(58) Field of Classification Search
None
See application file for complete search history.

(56) References Cited

U.S. PATENT DOCUMENTS

| 5,624,731 A | 4/1997 | Desjardins |
| 6,756,115 B2 | 6/2004 | Fu et al. |

(Continued)

FOREIGN PATENT DOCUMENTS

JP 2008239588 A 10/2008

OTHER PUBLICATIONS

Jiang et al., "Two-dimensional nonclose-packed colloidal crystals formed by spincoating", Applied Physics Letters, 2006, 011908-1-011908-3, vol. 89.

(Continued)

*Primary Examiner* — Alexandre Ferre
(74) *Attorney, Agent, or Firm* — Julie W. Meder

(57) ABSTRACT

A reflective material comprising a multilayered array of particles encapsulated by a matrix material, the reflective material defining a primary surface, the reflective material exhibiting: (i) visible retroreflection of incident radiation, wherein a wavelength of visible retroreflected radiation decreases from a first visible wavelength at a first angle to the primary surface to a second, shorter wavelength of visible retroreflected radiation as the viewing angle to the primary surface increases; and (ii) Bragg diffraction of the incident radiation, wherein the wavelength of radiation Bragg diffracted normal to the primary surface is longer than the wavelength of visible radiation, such that no visible radiation is retroreflected or Bragg diffracted in a direction normal to the primary surface.

11 Claims, 2 Drawing Sheets

(51) Int. Cl.
*G02B 5/02* (2006.01)
*G02B 5/128* (2006.01)
*B01J 13/02* (2006.01)
*B01J 13/14* (2006.01)
*B01J 13/18* (2006.01)
*B01J 13/22* (2006.01)

(52) U.S. Cl.
CPC ... *C01P 2004/64* (2013.01); *Y10T 428/31855* (2015.04)

(56) References Cited

U.S. PATENT DOCUMENTS

| | | | |
|---|---|---|---|
| 6,789,905 B2* | 9/2004 | Hall | B05D 5/063 106/228 |
| 6,939,605 B2 | 9/2005 | Frese et al. | |
| 8,133,938 B2 | 3/2012 | Munro et al. | |
| 8,252,412 B2 | 8/2012 | Purdy et al. | |
| 2007/0100026 A1* | 5/2007 | Munro | C08F 265/04 523/200 |
| 2008/0187708 A1* | 8/2008 | Decker | B05D 5/061 428/98 |
| 2009/0038512 A1 | 2/2009 | Xu et al. | |
| 2009/0153953 A1 | 6/2009 | Banerjee et al. | |
| 2010/0315703 A1* | 12/2010 | Purdy | G02B 1/005 359/350 |
| 2013/0044365 A1 | 2/2013 | Han et al. | |
| 2013/0075676 A1* | 3/2013 | Purdy | B82Y 20/00 252/586 |

OTHER PUBLICATIONS

McDonald et al., "Emulsion Polymerization of Voided Particles by Encapsulation of a Nonsolvent", Macromolecules, 2000, 1593-1605, vol. 33, No. 5.

Pavlyuchenko et al., "Hollow-Particle Latexes: Preparation and Properties", The Journal of Polymer Science: Part A: Polymer Chemistry, 2001, 1435-1449, vol. 39.

Tikhonov et al., "Reflectivity enhanced two-dimensional dielectric particle array monolayer diffraction" Journal of Nanophotonics, 2012, 063509-1-063509-9, vol. 6.

Yuan et al., "Preparation of Monodispersed Hollow Polymer Particles by Seeded Emulsion Polymerization under Low Emulsifier Conditions", Journal of Applied Polymer Science, 2005, 1505-1510, vol. 98.

Zhang et al., "Asymmetric Free-Standing 2-D Photonic Crystal Fils and Their Janus Particles", J. Am. Chem. Soc., 2013, 11397-11401, vol. 135.

* cited by examiner

RETROREFLECTIVE COLORANTS

FIELD OF THE INVENTION

This invention relates to crystalline colloidal arrays that exhibit retroreflection of incident radiation. In particular, this invention relates to retroreflective crystalline colloidal arrays provided as a monolayer structure or a multilayered structure, which Bragg diffracts radiation outside the visible spectrum when viewed in a direction normal to the structure.

BACKGROUND OF THE INVENTION

Crystalline colloidal arrays have been used for a variety of purposes. A crystalline colloidal array (CCA) is an ordered array, typically produced from monodispersed colloidal particles, which may be composed of inorganic or organic materials. Such CCAs are often provided in a hexagonal close-packed (HCP) or random hexagonal close-packed (RHCP) structure and may exhibit a layered structure with a preferred diffraction axis that is perpendicular to the layers in the structure. The diffraction wavelength varies with the angle of incidence to these layers. When fixed in a binder as a colorant, such CCAs can diffract radiation in the visible spectrum. These colorant CCAs may exhibit a goniochromatic effect when applied to a substrate.

SUMMARY OF THE INVENTION

The present invention includes a reflective material comprising a multilayered array of particles encapsulated by a matrix material, the reflective material defining a primary surface, the reflective material exhibiting: (i) visible retroreflection of incident radiation, wherein a wavelength of visible retroreflected radiation decreases from a first visible wavelength at a first angle to the primary surface to a second, shorter wavelength of visible retroreflected radiation as the viewing angle to the primary surface increases; and (ii) Bragg diffraction of the incident radiation, wherein the wavelength of radiation Bragg diffracted normal to the primary surface is longer than the wavelength of visible radiation, such that no visible radiation is retroreflected or Bragg diffracted in a direction normal to the primary surface.

Also included in the present invention is a reflective composition comprising a resinous binder and reflective material dispersed in the binder. The reflective material comprises an array of particles encapsulated by a matrix material and defining a primary surface, the reflective material exhibiting visible retroreflection of incident radiation, wherein the wavelength of visible retroreflected radiation decreases from a first visible wavelength at a first angle to the primary surface to a second, shorter wavelength of visible retroreflected radiation as the viewing angle to the primary surface increases, with no visible radiation being retroreflected in a direction normal to the primary surface. Further included in the present invention is a composite retroreflective pigment comprising a pigment particle; and a crystalline colloidal array of particles received on the pigment particle.

DETAILED DESCRIPTION OF THE INVENTION

Figure 1:
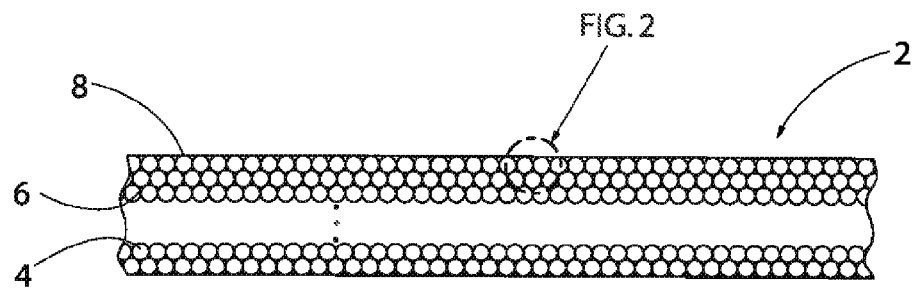
FIG. 1 is a schematic cross-section of the retroreflective material made in accordance with the present invention.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids.

The present invention includes retroreflective materials suitable for use as pigments in coating compositions or other applications. While the present invention is described in regards to retroreflection of visible light, the present invention may also be practiced outside the visible spectrum. As used herein, the term "retroreflection", "retroreflected", and the like refer to the feature of radiation such as visible light striking a surface and being reflected and redirected back in the direction of the source of the radiation or light. In addition, as used herein by the phrase "exhibiting Bragg diffraction" or the like is meant that the material diffracts radiation according to Bragg's Law. The retroreflective material of the present invention may be a crystalline colloidal array, which may include a single layer of particles (a "two-dimensional array") or include a multilayered structure having multiple layers of particles (a "three-dimensional array"). For multilayered structures, the parallel planes or layers formed by an array of particles interact with incident radiation according to Bragg's Law, such that the radiation striking the crystals is diffracted whereby radiation that meets the Bragg condition is reflected by the plane of the material while other wavelengths of radiation are transmitted therethrough. In the visible spectrum, diffracted light may be goniochromatic, i.e., the color of reflected radiation may depend on the viewing angle. The wavelength of the diffraction of light at a given angle is proportional to the distance between the Bragg planes formed by the periodic array of particles, which is proportional to the particle diameter for HCP crystals and may be proportional to the particle diameter for face centered cubic (FCC) crystals and simple cubic crystals. The diffraction wavelength may be tuned to a desired wavelength band by various means such as by selecting the particle size (i.e., the distance between Bragg planes) and/or selecting materials for the colloidal crystal to alter the effective refractive index.

The diffraction wavelength also depends on the effective refractive index of the materials that compose the colloidal crystal. The effective refractive index of the colloidal crystal is closely approximated as a volume average of the refractive index of the materials of the colloidal crystal. The intensity of the diffracted radiation is dependent in part on the quantity of layers present in the crystal, with a greater number of layers producing higher diffraction intensity. The intensity of the diffracted radiation is also dependent on the difference in refractive index between the planes of the particles and the planes of the surrounding materials. Higher refractive index contrast between alternating planes or layers increases diffraction intensity.

Various compositions may be used for the particles, including but not limited to organic polymers such as polystyrene, polyurethane, acrylic polymers, alkyd polymers, polyesters, siloxane-containing polymers, polysulfides, epoxy-containing polymers and inorganic materials such as metal oxides (e.g. alumina, silica, zinc oxide, or titanium dioxide) or composites of these materials. The particles may be unitary (i.e. having a single composition). Alternatively, the particles may have a core-shell structure where the core may be produced from the same materials as the above-described unitary particles, as described in U.S. Pat. No. 8,133,938, incorporated herein by reference.

In one embodiment of the invention, for core-shell particles, the core may be composed of a high refractive index material (e.g. over 1.65) such as $TiO_2$ or the like, such as ZnO, $ZrO_2$, PbO, ZrSi, $ZrSiO_4$, ZnS, or $ZnSe_2$. The high refractive index core may be surrounded by a polymeric shell produced from the above-described polymers. The shell may be produced from polymeric materials which are applied to the core particle (e.g. $TiO_2$) in multiple layers thereby creating a multilayered polymeric shell surrounding a particle core. For example, $TiO_2$ particles (or other high refractive index inorganic particles) may be treated with an organic molecule that will bind to the $TiO_2$ to functionalize the surface of the particles with a functional group, such as an acrylic functional group. A polymer shell may be produced by polymerizing monomers with the organic molecule functional group, optionally with a crosslinker and/or a free radical initiator. The shelling process may be repeated to achieve a desired diameter of the particles. In one embodiment, the core particles are sized about 200 nm in diameter.

In one embodiment, the particles used in the colloidal crystals of the present invention are hollow particles, which may be produced by a solvent encapsulation or produced by swelling the particles in an acid or a base. By "hollow" it is meant that the particles define one or more voids, which may be filled with air or other gas. Air-filled voids, having a low refractive index, may impart a relatively large refractive index contrast relative to the polymers of the shell and the remainder of the colloidal crystals. The voids in the particle cores may reduce the cost of materials and render the particles lighter weight.

Solvent encapsulation involves an emulsion polymerization process that encapsulates a nonsolvent hydrocarbon for the polymer being formed. A low molecular weight polymer phase separates in a dispersed hydrocarbon-monomer mixture. After evaporation of the solvent, the resulting monodispersed particles may define a plurality of voids or a single void. A suitable process for producing hollow particles by solvent encapsulation is described in McDonald et al., *Macromolecules*, 2000, 33, 1593-1605.

Hollow particles may be prepared by swelling with an acid or base according to the process described in Pavlyuchenko et al., *Journal of Polymer Science*, Part A: Polymer Chemistry, Vol. 39, 1435-1449 (2001) and/or Cai-Deng Yuan et al., *Journal of Applied Polymer Science*, Vol. 98, 1505-1510 (2005). A core latex particle may be encapsulated with at least one polymer shell. The particle may be treated with a swelling component (e.g. an aqueous base) that expands both the core and shell. Upon drying and crosslinking the shell, the core shrinks to yield one or more voids within the crosslinked shell. In one embodiment, a seed core particle may be encapsulated with at least three shells, and the seed core may be subsequently neutralized with a swelling component (to produce an internal void) with crosslinking of at least one of the shells. The size of such multi-shelled hollow particles, and thus the diffraction wavelength of a colloidal crystal produced therefrom, may be controlled by the size of the original seed core particle and/or the thickness and quantity of shells. For example, smaller seed core particles result in smaller diameter hollow particles that, when arranged in a colloidal crystal, reflect at a shorter diffraction wavelength (e.g. blue light) while larger seed core particles may be used to produce larger hollow particles and colloidal crystals that reflect longer diffraction wavelengths such as green or red light, thereby providing for tuning of the diffraction wavelength of the colloidal crystals as described above.

For either type of hollow particle, an ionic monomer such as 4-styrenesulfonic acid sodium salt or a polymerisable surfactant such as SIPOMER® PAM 200 may be incorporated in the shell as necessary to promote self assembly by increasing the surface charge. Steric stabilizing groups such as obtained from polyethylene glycol (MPEG) containing acrylate monomers may be incorporated in the shell to stabilize the particles in an organic environment. These stabilizing groups should be of sufficient length and size to hinder particle-particle coagulation and be soluble or compatible with the solvent and organic material of a film-forming composition into which they will ultimately be received.

The dispersion of particles (hollow, core-shell or unitary) may be purified to remove excess raw material, by-products, solvents, and the like. Electrostatic repulsion of the charged particles causes the particles to align themselves into an ordered, packed array. By ordered, packed array, it is meant that the particles pack together and the particles are arranged in a regular structure (FCC, simple cubic, RHCP or HCP) and may touch each other, yet remain as discrete particles.

In one embodiment, the dispersion of monodisperse particles may be assembled into an array by purifying the dispersion, applying the dispersion onto a substrate and drying the dispersion. The concentration of particles in the dispersion (as a volume percent (vol. %) of the dispersion) may be selected based at least in part on the desired structure (e.g., monolayer or multilayered) and desired optical effect (e.g., intensity of retroflection and/or Bragg diffraction).

For a dispersion of particles used to produce a monolayer retroreflective material, the concentration of particles in the dispersion and the wet film thickness of the particle dispersion may be selected to achieve the desired retroreflection by the dried dispersion, with particles of a given size being in the range of 10-1000 nm or 100-1000 nm, such as 200-500 nm. It has been found that in some embodiments, to produce a monolayer retroreflective material, the concentration of particles and the thickness of a wet film of the dispersion may be controlled such that a value calculated upon multiplication of the wet film thickness (in microns) by the vol. % of particles may be a value of 1-70 or 15-60. For example, for a monolayer of particles applied to substrate at a wet film thickness of 10 microns, the concentration of particles may be 2-5 vol. %.

For a dispersion of particles used to produce a retroreflective material having multiple layers of particles, the concentration of particles in the dispersion may be 2-70 vol. % or 3-60 vol. %. The wet film thickness may be 5-40 microns, such as 20 microns.

For either monolayer material or multilayered material, the particle dispersion can be applied to the substrate by dipping, spraying, brushing, roll coating, curtain coating, flow coating, or slot die coating to a desired thickness. Upon drying, the particles self-align as discrete particles into a CCA and retroreflect radiation accordingly. The CCA may be ground into crystals of a suitable size, such as less than 5 microns, for example about 2.5 microns, for use in coating compositions or the like. Alternatively, the dried CCA may then be overcoated with a curable binder. Upon curing, the resulting material may be ground into aggregates of binder and CCA crystals of suitable size, such as less than 5 microns or about 2.5 microns for use in coating compositions or the like.

The matrix material may be an organic polymer such as polystyrene, polyurethane, acrylic polymers (including without limitation, acrylic monomers crosslinked with pentaerythritol tetra(3-mercaptopropionate) such as THIO-CURE® PETMP, melamine, melamine polyols, and/or glycouril), alkyd polymers, polyester, siloxane-containing polymers, epoxy-containing polymers, and/or polymers derived from an epoxy-containing polymer. In one embodiment, the matrix material is a water-soluble or hydrophilic acrylic polymer. Suitable monomers for producing a water soluble or hydrophilic matrix include, but are not limited to, melamine, glycouril, ethoxylated trimethylolpropane triacrylate, polyethylene glycol, (600) diacrylate, polyethylene glycol, (400) diacrylate, polyethylene glycol, (200) diacrylate, and acrylic acid, followed by curing of the matrix composition to yield an organic matrix. Other suitable monomers for producing a water soluble or hydrophilic polymer matrix may include polyethylene glycol (1000) diacrylate, methoxy polyethylene glycol (350) monoacrylate, methoxy polyethylene glycol (350) monomethacrylate, methoxy polyethylene glycol (550) monomethacrylate, methoxy polyethylene glycol (550) monoacrylate, ethoxylated30 bisphenol A diacrylate, 2-(2-ethoxyethoxy) ethyl acrylate, acrylamide, hydroxyethyl acrylate, hydroxypropyl acrylate, polyethylene glycol (600) dimethacrylate, polyethylene glycol (400) dimethacrylate, ethoxylated30 bisphenol A dimethacrylate, hydroxyethyl methacrylate, and hydroxypropyl methacrylate.

The array of particles received in a matrix may be produced on a substrate that functions as a temporary support or on a substrate that is a desired end-use for the material. Examples of temporary support include a flexible material such as metal sheet or foil or a film of polyester or polyethylene terephthalate (PET) or any flexible material such as glass or plastic or am inflexible material such as a surface of a rotating drum of a drum dryer. By "flexible" it is meant that the substrate can undergo mechanical stresses such as bending, stretching, compression and the like without significant irreversible change thereto.

In one embodiment of the invention, the retroreflective material may be produced on a temporary substrate and removed therefrom in flake form. The flakes may be reduced in size to be suitable for use in a coating composition. The coating composition may be a hard coat such as a silica-sol gel clear coat such as an acrylic functional resin as used in automotive coatings, a basecoat such as an automotive basecoat or an ink composition.

Figure 2:
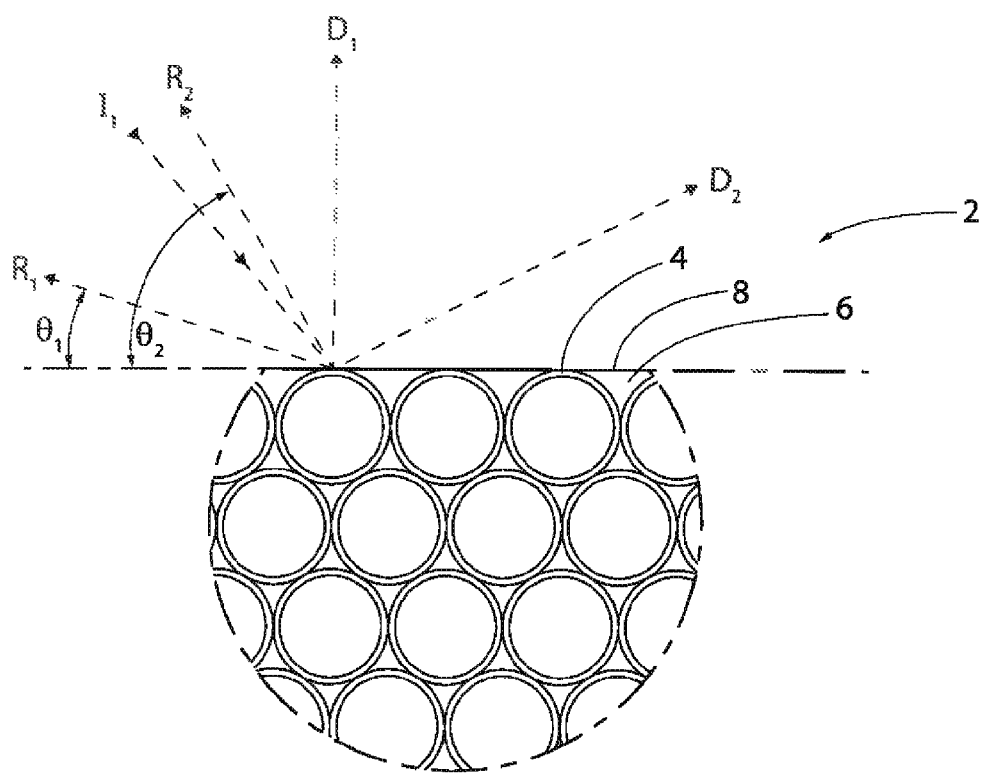
FIG. 2 is a detail of the material of FIG. 1, depicting retroreflection and Bragg diffraction.

The retroreflective material of the present invention may be a monolayered crystalline colloidal array or a multilayered crystalline colloidal array. FIG. 1 depicts a portion of the retroreflective material 2 as a multilayered CCA, but this is not meant to be limiting. The retroreflection depicted in FIG. 2 and described herein is applicable to monolayered CCAs of the present invention, such as shown in FIG. 3B. Material 2 includes particles 4 (uniform or core-shell as described above) received in a matrix 6 and defining a reflecting surface 8. In either the single layer or multilayered structure, the reflection of radiation therefrom generally is as depicted in FIG. 2. As shown therein, incident light $I_1$ is reflected back (retroreflected) in the direction of the source of the incident light as reflected light. When viewed at angle θ to the material, the wavelength of reflected radiation is inversely proportional to the size of the angle, i.e., the wavelength of reflected radiation decreases as the viewing angle θ increases. The wavelength of reflected light represented by ray $R_1$, viewed at angle $θ_1$ is longer than the wavelength of light visible reflected at angle $θ_2$ represented by ray $R_2$. Thus, for example, when incident white light strikes the retroreflective material, light that is retroreflected along ray $R_1$ may appear red whereas the light reflected along ray $R_2$ may appear blue.

In addition, for multilayered CCAs that meet the Bragg conditions, Bragg diffracted light that strikes the surface and reflects normal to the surface as depicted by ray $D_1$ may be invisible, such as in the infrared spectrum. Some visible light may be Bragg diffracted in the direction opposite that of the incident light $I_1$, such as shown by ray $D_2$ and may exhibit a color.

Figure 3A:
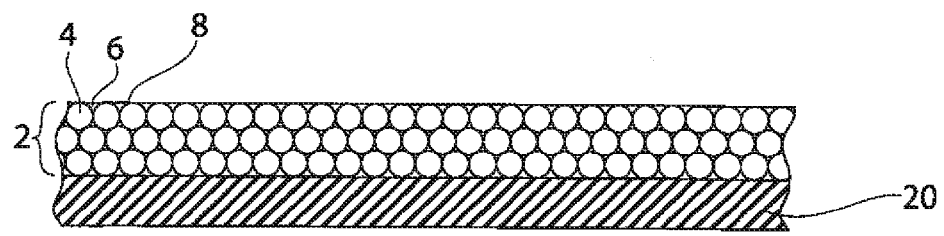
FIG. 3A is a schematic of one embodiment of a retroreflective material applied to a substrate.
Figure 3B:
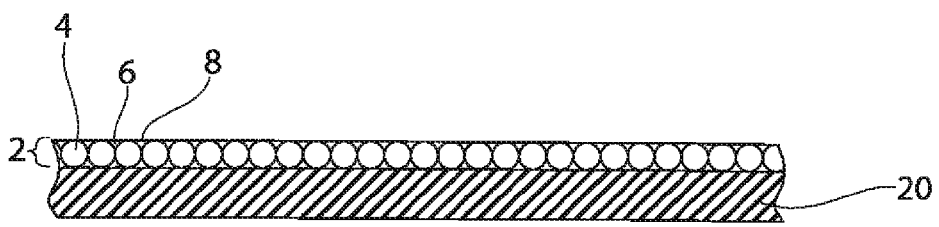
FIG. 3B is a schematic of one embodiment of a retroreflective material applied to a substrate.
Figure 4:
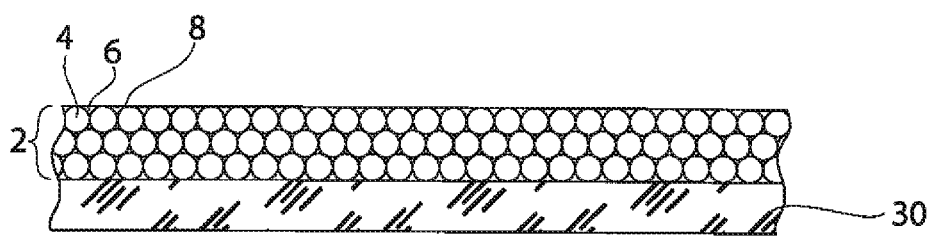
FIG. 4 is a schematic of one embodiment of a retroreflective material applied to a substrate.
Figure 5:
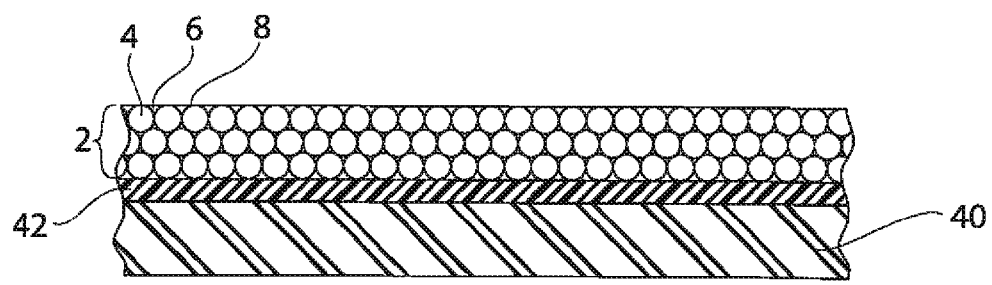
FIG. 5 is a schematic of one embodiment of a retroreflective material applied to a substrate.

The retroreflective material 2 may be in flake form for inclusion in a dispersion or other carrier, e.g. as a retroreflective colorant, or it may be positioned on a reflective substrate 20, thereby enhancing the retroreflective effect, as shown in FIG. 3A (depicting a multilayered crystalline colloidal array of particles 4 received in a matrix 6 applied to reflective substrate 20) and in FIG. 3B (depicting a monolayer crystalline colloidal array of particles 4 received in a matrix 6 applied to reflective substrate 20). In one embodiment, the retroreflective material is applied directly onto the substrate with no intervening layer of other material therebetween. Suitable reflective substrates include reflective flake pigments such as mica, aluminum flakes, and the like. Alternatively, the retroreflective material 2 (monolayer or multi-layered) may be applied to a transparent or translucent substrate 30, such as glass or plastic, as shown in FIG. 4, or to a radiation absorbing substrate such as substrate 40 bearing at least one coating composition 42 containing radiation absorbing pigments as shown in FIG. 5. In addition, the reflective substrate or the radiation absorbing substrate onto which the retroreflective material 2 is applied may be a pigment particle. The structures depicted in FIGS. 1-5 are for illustration purposes, and the present invention should not be considered as limited thereto.

It should be understood that, where not mutually exclusive, the various features of the embodiments of the present invention described, shown and/or claimed herein may be used in combination with each other. In addition, the following Examples are presented to demonstrate the general principles of the invention. All amounts listed are described in parts by weight, unless otherwise indicated. The invention should not be considered as limited to the specific Examples presented.

EXAMPLES

Example 1: Particle Core Latex

A seed core particle latex was prepared as follows. Deionized (DI) water (530 g) was first charged into a four-necked round bottom flask fitted with a thermocouple, mechanical stirrer, and condenser, and then heated up to 80° C. under $N_2$ blanket. Once the temperature reached 80° C., a mixture of 1.5 g of ammonium persulfate and 18 g of DI water was charged into the flask and mixed for 15 minutes. Then, a pre-emulsion of 22 g of DI water, 1.2 g of Disponil FES 993 (an emulsifier, available from BASF), and 22 g of methyl methacrylate (MMA), was charged all at once into the flask and held at 80° C. for 30 minutes. After holding was completed, a pre-emulsion of 530 g of DI water, 2.25 g of SR 550 (methoxy polyethylene glycol (350) monomethacrylate, available from Sartomer), 6.0 g of Disponil A 1080 (a nonionic surfactant, available from BASF), 7.5 g of Disponil FES 993, 3 g tert-dodecyl mercaptan, 150.0 g of methacrylic acid (MAA), and 300 g of MMA, was charged into the flask over 4 hours. After the charge was completed, it was held at 80° C. for an additional 30 minutes before being cooled down to room temperature.

Example 2: Hollow Particle Dispersion

Hollow particles were prepared using the seed core particle latex produced in Example 1 as follows. DI water (1398 g) was first charged into a four-necked round bottom flask fitted with a thermocouple, mechanical stirrer, and condenser, and then heated up to 85° C. under $N_2$ blanket. Once the temperature reached 85° C., a mixture of 3 g of ammonium persulfate and 30.0 g of DI water was charged into the flask, and then 200 g of the seed core particle latex from Example 1 was charged into the flask, following with 57 g DI water. The mixture was held at 77° C. for 10 minutes.

Three shells were formed over the seed particles by first charging into the flask (over 60 minutes) a first monomer charge of a pre-emulsion of 76.5 g of DI water, 1.80 g of sodium dodecylbenzenesulfonate (SDBS), 9.0 g of MAA, 60.0 g of MMA, 1.5 g of divinyl benzene (DVB), and 84.0 g of styrene. Immediately after the first monomer charge was completed, a second monomer charge of a pre-emulsion of 303.0 g of DI water, 2.25 g of ammonium persulfate, 3.3 g of SDBS, 12.0 g of MAA, 12.0 g of DVB, and 600.0 g of styrene, was charged over 90 minutes into the flask. After that, the mixture was heated up to 90° C., and held at 90° C. for 15 minutes. After holding, a third monomer charge of a pre-emulsion of 90.0 g of DI water, 1.5 g of Reasoap SR-10 (reactive surfactant form Adeak), 0.6 g of ionol, 90.0 g of DVB, and 0.6 g of sodium styrene sulfonate (SSS) from Aldrich Chemical Company, Inc., and 75 g of styrene, was charged into the flask over 10 minutes. A mixture of 36.0 g of 30% ammonia solution and 171.0 g of DI water was charged into the flask over 15 minutes, and held at 90° C. for 3 hours to swell the core and shells of the latex particles. The latex was cooled down to 77° C., and a mixture of 3.0 g of t-butyl hydroperoxide (70%) and 21.0 g of DI water was charged into the flask all at once. A mixture of 3.0 g of ascorbic acid and 120.0 g of DI water was then charged over 15 minutes to polymerize the styrene in the shell. The latex was then held at 77° C. for 30 minutes before being cooled to room temperature, yielding a latex dispersion of multi-shelled hollow particles. The resulting dispersion was filtered through a one-micron bag filter.

The hollow particle dispersion was further ultrafiltered using a 4-inch ultrafiltration housing with a 2.41-inch polyvinylidine fluoride membrane, both from PTI Advanced Filtration, Inc., Oxnard, Calif., and pumped using a peristaltic pump at a flow rate of approximately 170 ml per second. DI water (850 g) was added to the dispersion after 850 g of ultrafiltrate had been removed. This exchange was repeated several times until 10,200 g of ultrafiltrate had been replaced with 10,200 g DI water. Additional ultrafiltrate was then removed until the solids content of the mixture was 32% percent by weight.

Example 3: Hollow Particle CCA Flake

A mixture of the following ingredients was stirred together: 122.13 g of the hollow particle dispersion of Example 2, 42.57 g of DI water, 0.30 g of BYK-381 (a non-ionic surfactant from Altana, Byk-Additives), and 135.00 g of ethanol.

Ion exchange resin TMD-8 hydrogen and hydroxide form from Sigma-Aldrich, 3.5 g was added to 15 g of the mixture in a 2.5 oz. glass jar, and stirred for 30 minutes using a magnetic stir bar on a stir plate. The TMD-8 was filtered off with a one-micron bag filter. A draw down was made of the cleaned dispersion using a #12 wire wound bar (R. D. Specialties) onto a corona-treated polyethylene terephthalate (PET) film substrate and allowed to dry under ambient conditions to form a self-assembled CCA film.

A mixture of UV curable monomers from Sartomer (77% SR9003 and 10% SR295) with 10% ethanol, and 3% initiator was pipetted onto the CCA film. A piece of PET film cover sheet was placed over the monomer mixture. A roller was used to spread the monomer mixture over the CCA film. The monomer mixture was then cured with UV light. After removing the cover sheet, a razor blade was used to peel flakes of the over-coated CCA film off of the PET substrate. The quantity of layers of spheres in the CCA flakes was measured using scanning electron microscopy to be 12 layers. The collected CCA flakes were ball milled using a WIG-L-BUG® ball mill for about 45 seconds. The milled flakes were passed through a paper cone paint filter (with 250-300 µm sized holes) to remove over-sized material. The filtered flakes (0.18 g) were added to 2.76 g of Hi-Tech Clear Coat available from PPG Industries, Inc.

The clear coat with CCA flakes was poured onto a black plastic panel and coated to a very thick film (about 280 microns dry film thickness). This was allowed to flash (dry) for 16 hours to prevent popping during cure. Then the panel was baked at 100° C. for 30 minutes. The coated panel displayed a sparkling light with significant angle dependent color. When light was shone at a glancing angle to the panel, the retroreflective light appeared red. When light was shone at this same glancing angle, but the panel was observed from the side (at 90 degrees from the illumination plane), the panel appeared green.

Example 4: Hollow Particle CCA Flake

The following ingredients were stirred together to produce a latex dispersion: 247.25 g of the hollow particle dispersion of Example 2, 0.13 g of DI water, and 202.62 g of ethanol. Next, 90 g of TMD-8 hydrogen and hydroxide form ion exchange resin (Sigma-Aldrich) was added. The mixture was stirred with a magnetic stir bar on a stir plate for 2.5 hours. The mixture sat for about 22 hours before filtering off the TMD-8 with a one-micron bag filter.

The latex dispersion was coated onto a corona-treated 200 gauge PET film (FILMQUEST Group Inc., 13.5" wide, corona-treated to 64 dynes using Pillar P6000 (R. G. Egan Equipment, Inc.) corona-treating unit operated at 0.30 kW at 100 ft/min.) using a DynaCoat® Compact Slot Die Lab Coater from Frontier Industrial Technology, Inc. The DynaCoat® conditions were as follows: the latex feed was 22 g/min using a 10" width 0.004" thick shim with the coater speed at 30 ft/min, and the oven temperature was 125° F. The resulting assembled CCA had very bright retroreflective color. SEM analysis showed that the photonic crystal array was 10 layers deep.

The CCA assembly was overcoated with a UV curable acrylate coating composition, consisting of 77.7% propoxylated neopentyl glycol diacrylate (Sartomer SR9003), 9.7% pentaerythritol tetraacrylate (Sartomer SR295), 9.7% ethanol (Sigma-Aldrich), and 2.9% diphenyl(2,4,6-trimethylbenzoyl)-phosphine oxide/2-hydroxy-2 methylpropiophenone 50/50 UV initiator (Aldrich #405663). The DynaCoat® conditions for the overcoat were as follows: the acrylate coating feed was 17 g/min using a 10" width 0.003" thick shim with the coater speed at 10 ft/min, using a PET 92 gauge (1 mil thick) cover sheet. The DynaCoat® UV curing lamp was a standard Hg lamp with 280-365 nm wavelength output.

The resulting over-coated CCA film was scraped into flakes from the PET support film and milled with a WIG-L-BUG® ball mill (several batches at 45 seconds per batch). The grossly over-sized material was filtered off by passing the flakes through a paper cone paint filter (with 250-300 μm sized holes). 0.30 Grams of these flakes were added to 3.79 g of Hi-Tech Clear Coat and 0.3 g of n-butyl acetate to produce a formulation containing 15% flakes based on total solids. This formulation was drawn down onto a black plastic panel using a #100 wire wound draw down bar (R. D. Specialties). The coated panel was flashed for about 1 hour and was then baked for 30 minutes at 100° C. The coated panel displayed a sparkling luster with significant angle dependent color. When light was shone at a glancing angle at the panel, the retroreflective light appeared red. When light was shone at this same glancing angle, but the panel was observed from the side (at 90 degrees from the illumination plane), the panel appeared green.

Example 5: Solid Particle Dispersion

A dispersion of polystyrene particles in water was prepared via the following procedure. 2.0 Grams of sodium bicarbonate from Aldrich Chemical Company, Inc., 5.0 g Aerosol MA-80 from Cytec, 150 g ethylene glycol from Aldrich Chemical Company, 1.4 g sodium styrene sulfonate (SSS) from Aldrich Chemical Company, Inc., and 3.0 g Brij 35 from Aldrich Chemical Company, were mixed with 2400 g DI water and added to a flask equipped with a thermocouple, heating mantle, stirrer, reflux condenser, and nitrogen inlet. The mixture was sparged with nitrogen for 15 minutes with stirring and then blanketed with nitrogen. After that, a mixture of 500 g styrene monomer was added with stirring. The mixture was then heated to 60° C. and held constant for 30 minutes. Next, sodium persulfate from the Aldrich Chemical Company, Inc. (6.0 g in 100 g DI water) was added to the mixture under stirring. The temperature of the mixture was maintained at 60° C. for approximately 4 hours. Following that, a pre-emulsified mixture of 250 g DI water, 2.0 g of Brij 35, 185 g styrene, 0.8 g SSS, and 1.0 g sodium persulfate was added to the flask with stirring. The temperature of the mixture was held at 60° C. for 4 hours. After that, a pre-emulsified mixture of 250 g DI water, 2.0 g of Brij 35, 1.0 g sodium persulfate, 68 g styrene, 102 g methyl methacrylate, 15 g ethylene glycol dimethacrylate, and 0.8 g SSS was added to the flask with stirring. The temperature of the mixture was held at 65° C. for an additional 4 hours. The resulting dispersion was filtered through a one-micron bag filter The polystyrene particle dispersion was further ultrafiltered using a 4-inch ultrafiltration housing with a 2.41-inch polyvinylidine fluoride membrane, both from PTI Advanced Filtration, Inc., Oxnard, Calif., and pumped using a peristaltic pump at a flow rate of approximately 170 ml per second. DI water (850 g) was added to the dispersion after 850 g of ultrafiltrate had been removed. This exchange was repeated several times until 4250 g of ultrafiltrate had been replaced with 4250 g DI water. Additional ultrafiltrate was then removed until the solids content of the mixture was 45% by weight.

Example 6: Solid Particle CCA Flake

The polystyrene particle dispersion of Example 5 was coated onto a corona-treated 200 gauge PET film (as in Example 4) using a DynaCoat® Compact Slot Die Lab Coater from Frontier Industrial Technology, Inc. The DynaCoat® conditions were as follows: the latex feed was 24.7 g/min using a 10" width 0.004" thick shim with the coater speed at 20 ft/min, and the oven temperature was 180° F. The resulting assembled CCA had very bright retroreflective color. SEM analysis showed that the photonic crystal array was 10 μm deep.

The CCA assembly was overcoated with a UV curable acrylate coating composition consisting of 86.5% propoxylated neopentyl glycol diacrylate (Sartomer SR9003), 10.4% ethanol (Sigma-Aldrich), and 3.1% diphenyl(2,4,6-trimethylbensoyl)-phosphine oxide/2-hydroxy-2 methylpropiophenone 50/50 UV initiator (Aldrich #405663). The DynaCoat® conditions for the overcoat were as follows: the acrylate coating feed was 11 g/min using a 10" width 0.003" thick shim with the coater speed at 10 ft/min, using a PET 92 gauge (1 mil thick) cover sheet. A DynaCoat® UV curing lamp was used to cure the coating (standard Hg lamp with 280-365 nm wavelength output) to produce a CCA film on the PET substrate.

The CCA film was scraped into flakes from the PET substrate. DI water (1000 g) was added to a 2 L steel beaker, to which was added 03 g of Disperbyk-190 dispersant (Altana, Byk-Additives). The mixture was stirred with a Ross mill using a slotted stator at 5300 rpm to mix. Then, 1 gram of scraped CCA flake was added to the beaker and mixed for 4 minutes. The stator was changed to one with holes, and samples were milled for 4 minutes of mixing at 5600 rpm. The stator was then changed to a slot/screen (80 mesh) and milled for 4 minutes of mixing at 5600 rpm. The water/flake dispersion was allowed to settle overnight, and then the water was decanted off to concentrate the flake.

The concentrated CCA water flake dispersion was added to a styrene/acrylic copolymer waterborne acrylic resin and drawn down using a #14 wire wound draw down bar (R. D. Specialties) over a Byk contrast chart to give a coating with an estimated 5% flakes based on total solids. The drawdown was air dried. The coated panel showed prominent sparkle from the flakes and significant angle dependent color. When light was shown at a glancing angle at the panel, the retroreflected light was red. As the viewing angle was rotated from very oblique to about 30°, the color of the flakes changed from red through green to blue.

Example 7: Solid Particle Dispersion

A dispersion of polystyrene particles in water was prepared via the following procedure. Sodium bicarbonate (1.40 g) from Aldrich Chemical Company, Inc., 0.72 g Sipomer PAM 200 from Rhodia, and 1.8 g CD552 (methoxy polyethylene glycol (550) monomethacrylate) from Sartomer, 0.045 g sodium styrene sulfonate (SSS) from Aldrich Chemical Company, Inc., and 120 g of ethylene glycol, were mixed with 853 g DI water and added to a flask equipped with a thermocouple, heating mantle, stirrer, reflux condenser and nitrogen inlet. The mixture was sparged with nitrogen for 15 minutes with stirring and then blanketed with nitrogen. Styrene monomer (160 g) was added with stirring. The mixture was then heated to 70° C. and held constant for 30 minutes. Next, sodium persulfate from the Aldrich Chemical Company, Inc. (3.9 g in 24 g DI water) was added to the mixture under stirring. The temperature of the mixture was maintained at 70° C. for approximately 3 hours. Following that, a preemulsified mixture of 672 g DI water, 4.8 g Reasoap SR-10, 432 g styrene, 1.92 g SSS, and 0.8 g sodium persulfate was added to the flask with stirring. The temperature of the mixture was held at 70° C. for 4 hours. After that, a preemulsified mixture of 336 g DI water, 2.4 g Reasoap SR-10, 108 g styrene, 108 g methyl methacrylate, 7.2 g ethylene glycol dimethacrylate, 0.96 g SSS, and 0.4 g sodium persulfate was added to the flask with stirring. The temperature of the mixture was held at 70° C. for an additional 3 hours. The resulting dispersion of solid particles was filtered through a five-micron bag filter.

The solid particle dispersion was further ultrafiltered using a 4-inch ultrafiltration housing with a 2.41-inch polyvinylidine fluoride membrane, both from PTI Advanced Filtration, Inc., Oxnard, Calif., and pumped using a peristaltic pump at a flow rate of approximately 170 ml per second. DI water (850 g) was added to the dispersion after 850 g of ultrafiltrate had been removed. This exchange was repeated several times until 4250 g of ultrafiltrate had been replaced with 4250 g DI water. Additional ultrafiltrate was then removed until the solids content of the mixture was 46.8 percent by weight.

Example 8: Solid Particle Monolayer CCA Flake

A mixture of the following ingredients was stirred together: 44.83 g of the solid particle dispersion of Example 7, 449.51 g of DI water, 0.63 g of BYK-381, and 55 g of ethanol. This mixture was coated onto a corona-treated 200 gauge PET film using the same equipment as described in Example 4. The DynaCoat® conditions were as follows: the latex feed was 12.7 g/min using a 10" width 0.004" thick shim with the coater speed at 30 ft/min, and the oven temperature was 120° F. The resulting assembled CCA had retroreflective color. SEM analysis showed that the CCA was a monolayer.

A mixture of UV curable monomers from Sartomer (77.7% propoxylated neopentyl glycol diacrylate (Sartomer SR9003) and 9.7% pentaerythritol tetraacrylate (Sartomer SR295) with 9.7% ethanol, and 2.9% diphenyl(2,4,6-trimethylbensoyl)-phosphine oxide/2-hydroxy-2 methylpropiophenone 50/50 UV initiator (Aldrich #405663) was pipetted onto the CCA monolayer. A piece of PET film cover sheet was placed over the monomer mixture. A roller was used to spread the monomer mixture over the monolayer CCA film. The monomer mixture was then cured with UV light. After removing the cover sheet, a razor blade was used to peel the over-coated monolayer CCA off of the PET substrate. The collected CCA material was milled into flakes using a WIG-L-BUG® ball mill for about 60 seconds. A portion of the milled flakes was passed through a paper cone paint filter (with 250-300 μm sized holes), and another portion of the milled flakes was not passed through a filter. Thus, there were two resulting flake samples: Sample 8A with flakes less than about 300 microns in size, and Sample 8B with unfiltered flakes.

Example 8A

The flakes of Sample 8A (0.027 g) were mixed with 0.405 g of Hi-Tech Clear Coat and with 0.063 g of n-butyl acetate, to achieve a formulation with 13% flake based on total solids. The mixture was poured onto a black plastic panel and coated out to a thick film. This was flashed for 60 hours and then baked at 100° C. for 30 minutes. The resulting panel shows extremely slight angle dependent color.

Example 8B

The flakes of Sample 8B (0.048 g) were mixed with 0.720 g of Hi-Tech Clear Coat and with 0.112 g of n-butyl acetate, to achieve a formulation with 13% flake based on total solids. The mixture was poured onto a black plastic panel and coated out to a thick film. This was flashed for 60 hours and then baked at 100° C. for 30 minutes. The resulting panel shows very slight angle dependent color.

Example 9: Hollow Particle Monolayer CCA Flake

A dilution of the hollow particle dispersion of Example 2 was formulated to make a monolayer of spheres from a slot die coat out. The following ingredients were stirred together: 16.56 g of the hollow particle dispersion of Example 2, 115.2 g of DI water, 108 g of ethanol, and 0.32 g of a 50/50 mixture of DI water and Cymel 385 (from Allnex). This mixture was cleaned using TMD-8 hydrogen and hydroxide ion exchange resin (Sigma-Aldrich). The TMD-8 was filtered out with a one-micron bag filter. The cleaned mixture was coated onto a corona-treated 200 gauge PET film using the same equipment as described in Example 4. The DynaCoat® conditions were as follows: the latex feed was 22 g/min using a 10" width 0.004" thick shim with the coater speed at 30 ft/min, and the oven temperature was 120° F. The resulting monolayer assembled CCA had retroreflective color.

A mixture of a UV curable acrylate coating composition, consisting of 77.7% by weight of propoxylated neopentyl glycol diacrylate (Sartomer SR9003), 9.7% pentaerythritol tetraacrylate (Sartomer SR295), 9.7% ethanol (Sigma-Aldrich), and 2.9% diphenyl(2,4,6-trimethylbensoyl)-phosphine oxide/2-hydroxy-2 methylpropiophenone 50/50 UV initiator (Aldrich #405663) was pipetted onto the CCA. A piece of PET film cover sheet was placed over the monomer mixture. A roller was used to spread the monomer mixture over the CCA. The monomer mixture was then cured with UV light. After removing the cover sheet, a razor blade was used to peel the over-coated CCA film off of the PET substrate. The collected CCA material was milled into flakes using a WIG-L-BUG® ball mill for 60 seconds. The milled flakes were passed through a paper cone paint filter (with 250-300 µm sized holes) to remove over-sized material. The filtered flakes (0.27 g) were added to 4.0 g of Hi-Tech Clear Coat. This formulation was drawn down on a black substrate using a #44 wire wound draw down bar (R. D. Specialties) and baked for 30 minutes at 100° C. The cured coating showed angle dependent color. When light was shone at a glancing angle at the coating, the retroreflective color was observed to be red.

Whereas particular embodiments of this invention have been described above for purposes of illustration, it will be evident to those skilled in the art that numerous variations of the details of the present invention may be made without departing from the invention as defined in the appended claims.

The invention claimed is:

1. A reflective composition comprising:
   (a) a resinous binder; and
   (b) reflective material that does not exhibit Bragg diffraction dispersed in said binder, said reflective material comprising a two-dimensional ordered array of packed particles encapsulated by a polymeric matrix material and defining a primary surface, the reflective material exhibiting visible retroreflection of incident radiation, wherein a wavelength of visible retroreflected radiation decreases from a first visible wavelength at a first angle to the primary surface to a second, shorter wavelength of visible retroreflected radiation as the viewing angle to the primary surface increases, with no radiation being retroreflected in a direction normal to the primary surface.

2. The reflective composition of claim 1, wherein said reflective material is in flake form.

3. The reflective composition of claim 1, wherein said two-dimensional array of particles is prepared by slot die coating a dispersion of said particles onto a substrate.

4. The reflective composition of claim 1, further comprising a reflective substrate underlying said array.

5. The reflective composition of claim 4, wherein said reflective substrate comprises a flake pigment.

6. The reflective composition of claim 1, wherein said particles each comprise a polymeric shell defining a hollow core.

7. A composite retroreflective pigment that does not exhibit Bragg diffraction, comprising:
   a pigment particle; and
   a two-dimensional crystalline colloidal array of particles received on the pigment particle,
   wherein the array of particles is encapsulated by a matrix material and defining a primary surface, the composite retroreflective pigment exhibiting visible retroreflection of incident radiation, wherein a wavelength of visible retroreflected radiation decreases from a first visible wavelength at a first angle to the primary surface to a second, shorter wavelength of visible retroreflected radiation as the viewing angle to the primary surface increases, with no visible radiation being retroreflected in a direction normal to the primary surface.

8. The composite retroreflective pigment of claim 7, wherein said pigment particle comprises a flake pigment.

9. A coating composition comprising the composite retroreflective pigment of claim 7.

10. A method of producing the composite retroreflective pigment of claim 7 comprising spray drying a dispersion comprising pigment particles and monodisperse particles, such that the monodisperse particles self-assemble into an array of close-packed particles positioned on the pigment particles.

11. A reflective composition comprising:
    (a) a resinous binder; and
    (b) reflective material dispersed in said binder, said reflective material consisting of a two-dimensional ordered array of packed particles encapsulated by a matrix material and defining a primary surface, the reflective material exhibiting visible retroreflection of incident radiation, wherein a wavelength of visible retroreflected radiation decreases from a first visible wavelength at a first angle to the primary surface to a second, shorter wavelength of visible retroreflected radiation as the viewing angle to the primary surface increases, with no radiation being retroreflected in a direction normal to the primary surface.

* * * * *